(12) United States Patent
Ma et al.

(10) Patent No.: US 8,434,158 B2
(45) Date of Patent: Apr. 30, 2013

(54) SYSTEMS AND METHODS FOR DETECTING AND THWARTING UNAUTHORIZED ACCESS AND HOSTILE ATTACKS ON SECURED SYSTEMS

(75) Inventors: Jianxin Ma, Plano, TX (US); Sung Ung Kwak, Frisco, TX (US); Irfan Azam Chaudhry, Plano, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 95 days.

(21) Appl. No.: 13/220,012

(22) Filed: Aug. 29, 2011

(65) Prior Publication Data

US 2013/0055416 A1 Feb. 28, 2013

(51) Int. Cl.
*G06F 1/26* (2006.01)
*G06F 11/00* (2006.01)
*G08B 13/00* (2006.01)
*G08B 21/00* (2006.01)
*G08B 29/00* (2006.01)

(52) U.S. Cl.
USPC ........ 726/34; 340/539.31; 340/541; 340/551; 726/16; 726/35; 257/659; 257/790; 257/E23.191; 365/174; 365/63; 711/163

(58) Field of Classification Search ...................... 726/34
See application file for complete search history.

(56) References Cited

U.S. PATENT DOCUMENTS

2009/0146267 A1* 6/2009 Peytavy et al. ............... 257/659
2009/0212945 A1* 8/2009 Steen ............................ 340/541

* cited by examiner

*Primary Examiner* — Nathan Flynn
*Assistant Examiner* — Bryan Wright
(74) *Attorney, Agent, or Firm* — North Weber & Baugh LLP

(57) ABSTRACT

Various embodiments of the present invention relates to systems, devices and methods of detecting tampering and preventing unauthorized access by incorporating programmability and randomness into a process of coupling, driving and sensing conductive wires that are arranged above sensitive areas in a secured system. Such a tampering detection system comprises a security mesh network, a random number generator, a security controller and a security monitor. The security mesh network includes a plurality of security elements made from the conductive wires. The security controller selects a subset of security elements, forms a security array, and generates a driving stimulus. The security monitor selects a SENSE node, monitors an output at the SENSE node, and generates a flag signal indicating the presence of a tampering attempt. Programmability and randomness are introduced to at least one of the system parameters including array configuration, driving stimulus, SENSE node, and detection mode via random numbers.

20 Claims, 9 Drawing Sheets

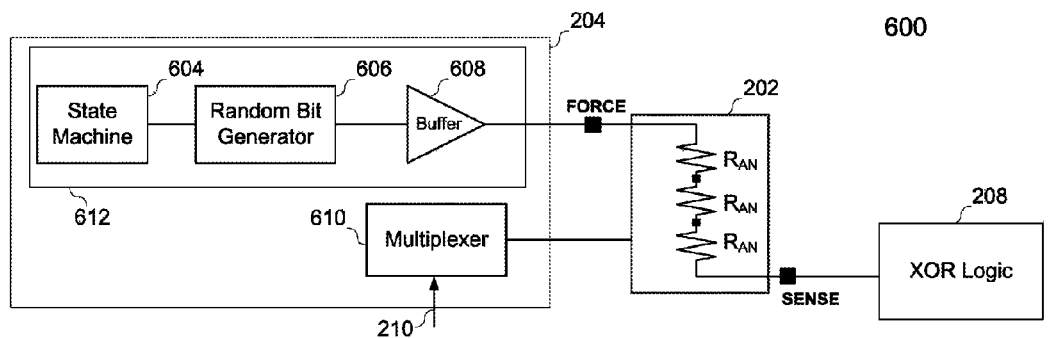
FIG. 6A
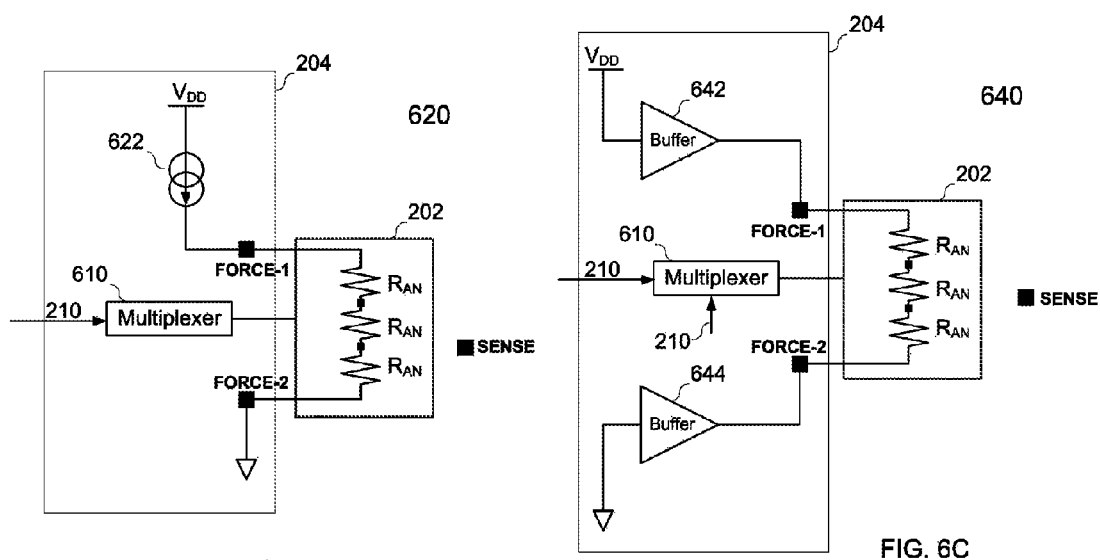
FIG. 6B
FIG. 6C
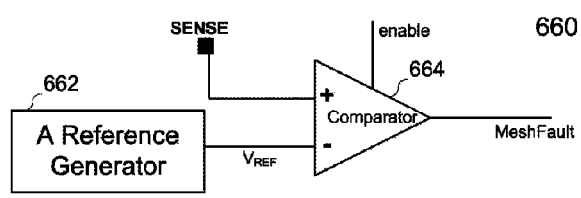
FIG. 6D

SYSTEMS AND METHODS FOR DETECTING AND THWARTING UNAUTHORIZED ACCESS AND HOSTILE ATTACKS ON SECURED SYSTEMS

BACKGROUND

A. Technical Field

The present invention relates generally to a secured system, and more particularly, to systems, devices and methods of detecting tampering and preventing unauthorized access by incorporating programmability and randomness in coupling, driving and sensing conductive wires that are arranged above sensitive areas in a secured system.

B. Background of the Invention

A secured system normally refers to an electronic system used for applications that involve trusted operations on valuable assets in a trusted environment. The electronic system may comprise integrated circuits including a central processing unit (CPU) core, memory, and input/output (I/O) peripherals that are used for processing, storing or communicating sensitive data in the secured system. This sensitive data may include account numbers, access codes, private information, financial transactions/balances, rights management, metering data (e.g., energy, units), program algorithms and other information. To date, the secured system has been applied in a wide range of security-critical applications such as electronic banking, commercial transactions, and pay-TV access control, or any application that requires protection of sensitive assets.

A thief or hacker may attempt to gain access to the sensitive data in the secured system through tampering sensitive areas of the integrated circuits (e.g., the CPU core, the memory and the I/O peripheries). The sensitive areas are normally covered by a shielding layer of coating material, and otherwise, the integrated circuit containing the sensitive areas may be encased in a shielding package. During an unauthorized access, the hacker has to probe through the shielding layer or package to gain access to the sensitive areas and data.

In order to detect the unauthorized access, a conventional secured system includes a tampering detection system based on a shielding layer configured as traces of conductive wires covering the sensitive areas. FIG. 1 illustrates an integrated circuit that is covered by traces of conductive wires. A force circuit and a sense circuit are integrated in the underlying integrated circuit. One end of a selected trace may be driven by a known stimulus (e.g., logic high or low), while the other end of the trace is monitored by the sense circuit. When the detected level is inconsistent with the known stimulus, the trace is considered broken or shorted to another trace, and tampering of the shielding layer is detected.

However, this type of detection is easy to bypass, and may not meet stringent security requirements emerging with state-of-the-art secured systems. The above tampering detection method only detects opens or shorts of the conductive traces in the shielding layer. In addition, the hacker may decipher the pattern of the known stimulus, and bypass the trace by applying the stimulus directly on the end for sensing. More straightforwardly, the hackers may even short two ends of the trace to circumvent tampering detection. As hacking techniques get increasingly sophisticated, such a simple tampering detection method cannot serve the objective, and competitive anti-tempering methods have to be introduced at a relatively low cost to prevent unauthorized accesses to a secured system, and particularly, to those involved in lucrative transactions.

SUMMARY OF THE INVENTION

Various embodiments of the present invention relates to systems, devices and methods of detecting tampering and preventing unauthorized access by incorporating programmability and randomness in a process of coupling, driving and sensing conductive wires that are arranged above sensitive areas in a secured system. Programmability and randomness are introduced to at least one of system parameters including array configuration, driving stimulus, SENSE node, and detection mode via random numbers.

One aspect of the invention is a tampering detection system that comprises a security mesh network, a random number generator, a security controller and a security monitor. The security mesh network further comprises a plurality of security elements, and each security element is made from one conductive metal wire. The random number generator generates a plurality of random numbers. The security controller is coupled between the random number generator and the security mesh network, selects a subset of security elements from the security mesh network according to at least one random number selected from the plurality of random number, forms a security array according to an array configuration, and generates a driving stimulus to drive the security array. The security monitor is coupled to the security mesh network and the security controller; and used to select at least one SENSE node, monitor an output at the SENSE node according to a detection mode, and generate a flag signal indicating whether a tampering attempt is detected.

Another aspect of the invention is a tampering detection system that comprises a security mesh network, a random number generator, a security controller and a security monitor. Particularly, the security monitor is based on a mixed detection mode in which a security array may be driven and sensed in an analog or digital detection mode.

One aspect of the invention is a method of detecting a tampering attempt in a secured system. A plurality of random numbers is generated. A subset of security elements is selected from a plurality of security elements according to at least one random number selected from the plurality of random numbers, and the plurality of security elements is included in a secure mesh network that covers sensitive area of an integrated circuit in the secured system. The selected security elements are coupled in series to form a security array according to an array configuration. A driving stimulus is subsequently generated to drive the security array. A SENSE node is selected from end nodes and intermediate nodes in the security array, and the output at this SENSE node is monitored according to a detection mode that is associated with the driving stimulus. A flag signal is outputted to indicate whether a tampering attempt is detected.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. ("FIG.") 1 illustrates an integrated circuit that is covered by traces of conductive wires.

FIG. 6A illustrates an exemplary block diagram of a tampering detection system based on a digital detection mode according to various embodiments of the invention.

FIG. 6B illustrates an exemplary block diagram of a security controller driving a security array in an analog mode according to various embodiments of the invention.

FIG. 6C illustrates another exemplary block diagram of a security controller driving a security array in an analog mode according to various embodiments of the invention.

FIG. 6D is an exemplary block diagram of an analog detection circuit that may be included in the security monitor in an analog mode according to various embodiments in the invention.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Rather than using conductive traces driven with predictable stimulus, the present invention introduces a programmable mesh network that are driven by a programmable stimulus and detected under a programmable mode. The programmable mesh network comprising an array of security elements, each made from a conductive trace that lies above a sub-area in a sensitive area. A plurality of security elements is selected and arranged according to an array configuration to form a security array. This array may be driven by a certain stimulus, and sensed at a selected node according to a detection mode selected from a group comprising an analog mode, a digital mode and a mixed mode. Therefore, various embodiments of the present invention relate to anti-tampering systems, devices and methods that are based on programmability, and particularly, programmability of array configuration, driving stimulus, sensing node and detection mode. Such programmability enhances the security level of the secured system and reduces its chance of being tampered.

Figure 1:
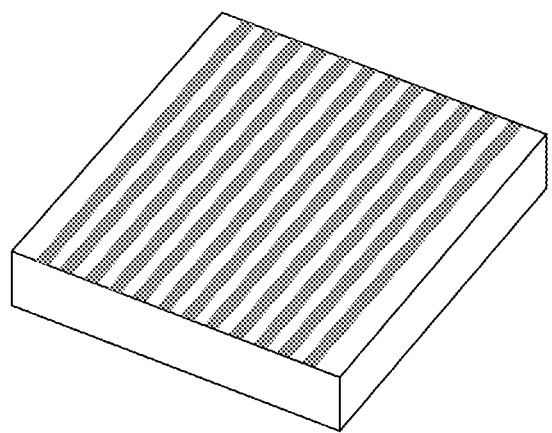
Figure 2:
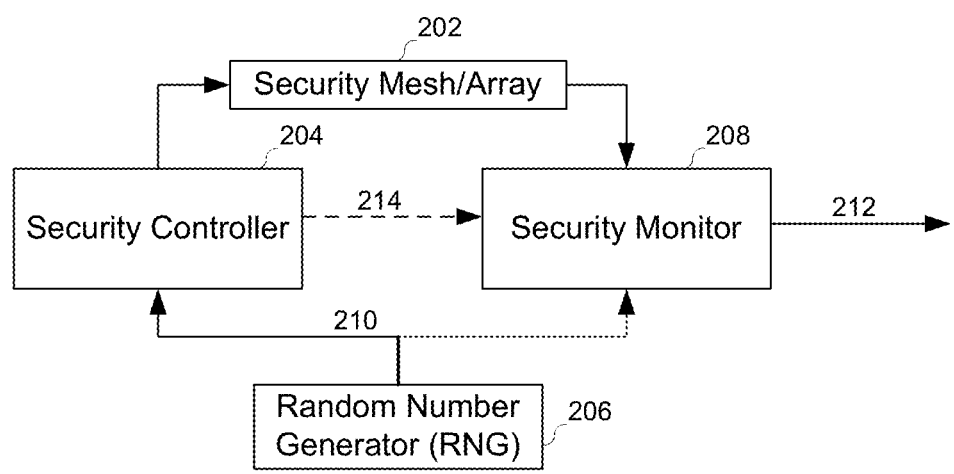
FIG. 2 illustrates an exemplary block diagram of a tampering detection system in a secured system according to various embodiments of the invention.

FIG. 2 illustrates an exemplary block diagram 200 of a tampering detection system in a secured system according to various embodiments of the invention. The tampering detection system comprises a security mesh network 202, a security controller 204, a random number generator (RNG) 206, and a security monitor 208. Programmability of this tampering detection system is introduced in the security controller 204 and monitor 208 according to at least one number provided by the RNG 206 such that the security mesh or array 202 is configured, driven or sensed in a random manner, imposing challenges to any hacker's tampering attempts.

The security mesh network 202 comprises an array of security elements covering a sensitive area where sensitive data may be processed or stored. In certain embodiment, each security element may be associated with a conductive wire, and therefore, each security elements in the network 202 may be modeled as a resistor which has a substantially constant resistance $R_{SE}$ across the network.

The RNG 206 generates a number of random numbers 210 including at least one random number for selecting at least one security element. In various embodiments of the present invention, a number of random numbers 210 may be generated by the RNG 206 during one detection cycle to associate with a plurality of security elements. Moreover, in addition to specifying security elements, the random numbers 210 may also be used to set parameters used in the security controller 204 and monitor 208, and these parameters including driving stimulus, SENSE node and detection mode determines programmability of the tampering detection system 200.

The security controller 204 is coupled between the RNG 206 and the security mesh network 202. During a certain detection cycle, the security controller 204 receives the plurality of random numbers 210 from the RNG 206, selects a plurality of security elements in the security mesh network 204, forms a security array, and drives the security array with a driving stimulus. As a result, the security mesh network 202 is randomized and programmed by the security controller 204 in terms of its organization, driving location, or driving method.

The security elements are selected according to the random numbers 210, and the security array is formed by arranging these security elements according to an array configuration. The array configuration refers not only to the security elements that are selected to form the security array, but also to an order in which these elements form the security array. In certain embodiments, the order of these elements is the order that these random numbers 210 used to select the security elements are generated from the RNG 206.

The driving stimulus may be selected from a digital data sequence and analog voltage/current levels, and applied at a FORCE node in the security array. In one embodiment, both the digital data sequence and analog levels may be generated according to the random number 210 provided by the RNG 206. In another embodiment, this driving stimulus is determined internally in the security controller 204.

The security monitor 208 is coupled to the security mesh network 202, selects at least one SENSE node from the security array, monitors the outputs at the SENSE node, and generates a flag signal 212. Particularly, the security monitor 208 monitors the outputs according to a detection mode selected from an analog, digital and mixed detection mode. In various embodiments of the present invention, selection of the SENSE node and the detection mode may also be determined by the random number 210 generated by the RNG 206. Since the detection mode and the SENSE are consistent with the array configuration and the driving stimulus, the security monitor 208 may receive an associated security mode signal 214 provided by the security controller 204.

The detection mode may be selected from a digital mode, an analog mode, and a mixed mode. The detection mode in the security controller 208 is consistent with the driving stimulus generated by the security controller 204. In the digital mode, the driving stimulus is associated with the digital data sequence comprising logic highs and lows, and is applied on at least one FORCE mode in the security array. The outputs at at least one SENSE nodes other than the FORCE mode are sensed and compared with the stimulus. In the analog mode, the driving stimulus may be associated with a current, a supply voltage $V_{DD}$ or a varying voltage level. While the stimulus is also applied on at least one FORCE node in the security array, at least one SENSE node output is analyzed based on its actual voltage levels, and is used for determining whether changes in electrical properties, such as an open or a short circuit, exist due to tampering. The analog mode is particularly used to detect a tampering attempt in a partial short case when only part of a security element is bypassed. In the mixed mode, both the analog and digital modes are used in different detection cycles within one secured system.

The SENSE node is not limited to the nodes included in the security array comprising of selected security elements. The output at a SENSE node located on the security array is dependent upon the driving stimulus, and the flag signal 212 is associated with validity of such a dependency. However, when the SENSE node is not located on the security array, the outputs are not correlated with the driving stimulus, and the flag signal 212 is associated with validity of such a non-correlation.

As a result, the flag signal indicates whether tampering and unauthorized access is detected. Upon detection of tampering, the integrated circuit may further use the flag signal to enable a series of actions including erasing sensitive data, triggering a non-maskable interruption, writing a value in a flag register, resetting the circuit, and running a dedicated code.

The array configuration may be identified by the random numbers 210 in an alternative way. Rather than being associated with the security elements, the random numbers 210 are directly associated with the array configuration, i.e. a specific combination of specific security elements. For instance, a random number of 101 is associated with an array configuration in which a first rows of security elements are coupled in series from left to right. The RNG 206 generates one random number that is associated with the array configuration at a time. The security controller 204 directly connects a number of security elements associated with this array configuration. As a result, the security controller 204 may further comprise a memory storing a lookup table that associates each random number with a number of security elements and a configuration of connecting them.

In various embodiments of the present invention, both the security controller 204 and monitor 208 comprise a plurality of analog switches to access end nodes of the security elements, such that these end nodes may be coupled to form the security array and selected as the SENSE or FORCE nodes, respectively.

The security mesh network 202 may be manufactured on the same substrate or on the package of the integrated circuit containing the sensitive area. Three exemplary methods of manufacturing the tampering detection system are disclosed as below based on the exemplary cross sections of the system.

Figure 3A:
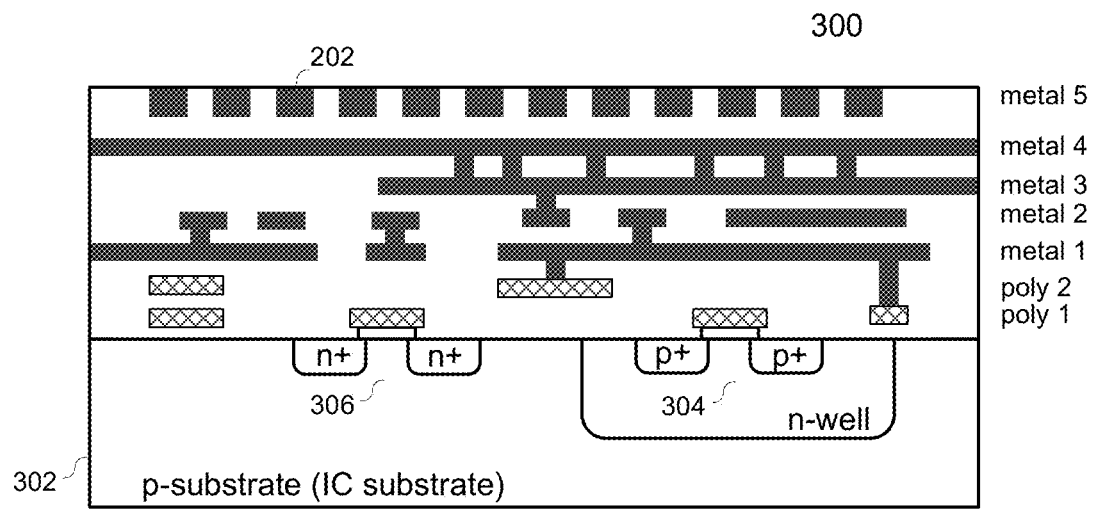
FIG. 3A illustrates an exemplary cross section of a sensitive area in an integrated circuit block according to various embodiments in the invention.

FIG. 3A illustrates an exemplary cross section 300 of a sensitive area in an integrated circuit block according to various embodiments in the invention. The integrated circuit block is built on an integrated circuit (IC) substrate 302 including transistors 304 and 306. The security controller 204 and monitor 208, and the RNG 206 are made from these transistors. A number of poly-silicon layers (e.g., poly 1, poly 2) and metal layers (e.g., metal 1-5) are sequentially manufacturing above the IC substrate 302 as gates and/or interconnects for transistors 304 and 306. The secure mesh network 202 may be integrated in a metal layer, and security elements in the network 202 are coupled to the underlying electronics via the intermediate metal layers. One of those skilled in the art knows that the secure mesh network 202 is preferably formed using the top metal layer, and however, may be formed from any metal layer underneath the top metal layer.

Figure 3B:
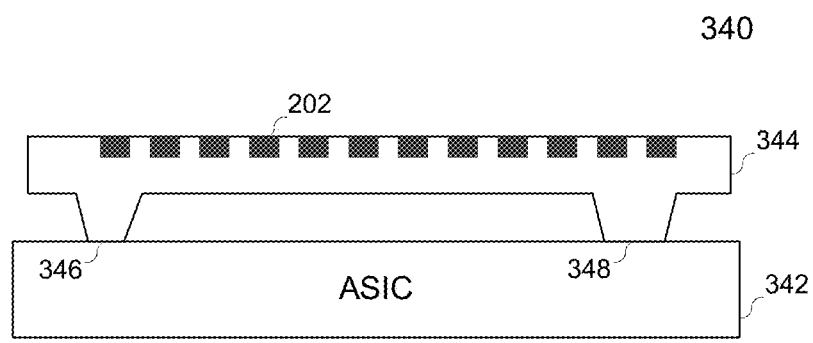
FIG. 3B illustrates an exemplary cross section of a first integrated circuit containing a sensitive area covered by a second integrated circuit according to various embodiments in the invention.

FIG. 3B illustrates an exemplary cross section 340 of a first integrated circuit 342 containing a sensitive area covered by a second integrated circuit 344 according to various embodiments in the invention. The security mesh network 202 may be manufactured from metal layers in the second integrated circuit that is atop the sensitive area included in the first integrated circuit. The security controller 204 and monitor 208, and the RNG 206 may be integrated on either of the first and second integrated circuits 342 and 344. However, as the security mesh network 202 and the rest of the tampering diction circuit 200 are located on two separate substrates, interconnects need to routed through the interface 346 and 348 between these two substrates 342 and 344.

Figure 3C:
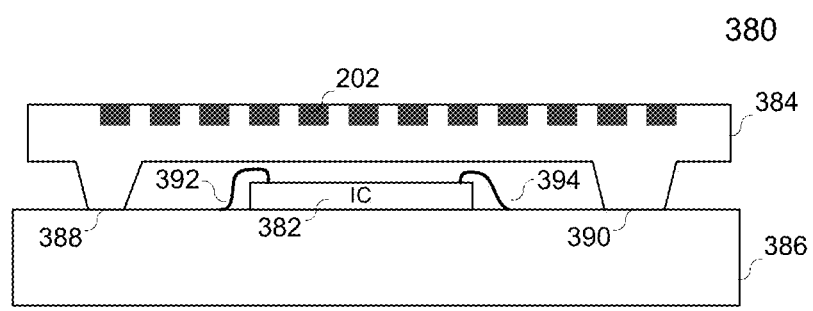
FIG. 3C illustrates an exemplary cross section of an integrated circuit containing a sensitive area packaged between two printed circuit boards (PCB) and according to various embodiments in the invention.

FIG. 3C illustrates an exemplary cross section 380 of an integrated circuit 382 containing a sensitive area packaged between two printed circuit boards (PCB) 384 and 386 according to various embodiments in the invention. The integrated circuit is mounted on the substrate of the PCB 386, and ultrasonically bonded to the PCB 386 via wires 392 and 394. The PCB 384 is coupled to the PCB 386 at the interface 388 and 390 to encapsulate the integrated circuit 382. The security mesh network 202 may be manufactured in metal layers of the PCB 384, while the rest of the tampering diction circuit 200 is integrated on the substrate of the integrated circuit 382.

In various embodiments of the present invention, the security mesh network 202 may be formed in, but not limited to, a single metal layer. The security mesh network may be formed on more than one metal layer, and certain routing scheme is needed to couple the network 202 to the security controller 204 and monitor 208.

Figure 4A:
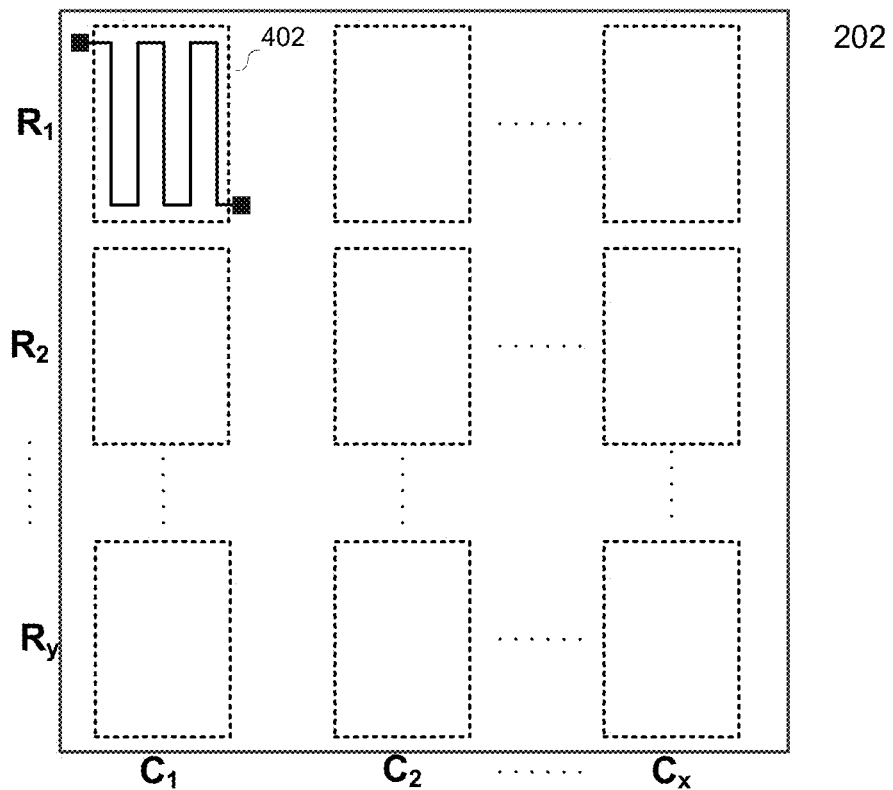
FIG. 4A illustrates an exemplary diagram of a security mesh network according to various embodiments of the invention.

FIG. 4A illustrates an exemplary diagram of a security mesh network 202 according to various embodiments of the invention. The security mesh network 202 comprises N identical security elements 402 arranged in x columns and y rows. The security element 402 comprises a conductive metal wire that may be implemented on a single layer or more than one layer of metal. The conductive metal wire may be a straight wire routed across the element along its row, column or diagonal direction, and it may also be arranged in various shapes.

Figure 4B:
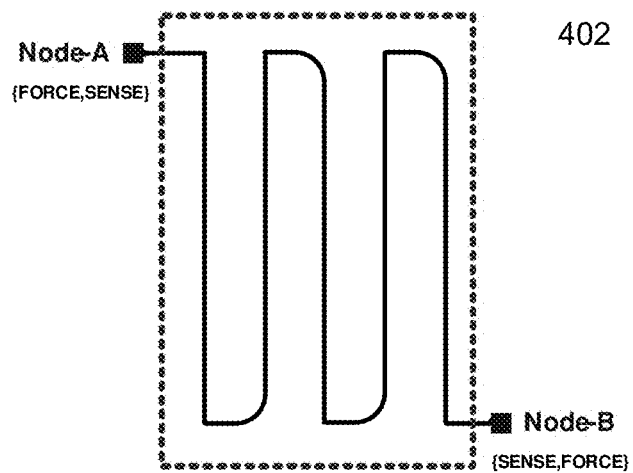
FIG. 4B illustrates an exemplary diagram of a security element in a security mesh network 202 according to various embodiments of the invention.

FIG. 4B illustrates an exemplary diagram of a security element 402 in a security mesh network 202 according to various embodiments of the invention. The security element 402 comprises a piece of serpentine shaped metal wire and two end nodes. The two end nodes are Node-A and Node-B that may be coupled for driving and sensing of the security element 402 or may be coupled to end nodes of other security elements.

Regardless of its configuration, each security element is associated with a resistance $R_{SE}$. Tampering normally involves removing partial or entire mesh network 202 or directly probing through the network 202 to get access to the sensitive area. As a result, upon tampering, the resistance $R_{SE}$ varies to zero, infinity or a different value for a bypassed, broken, or partially shorted security element, respectively.

Figure 5A:
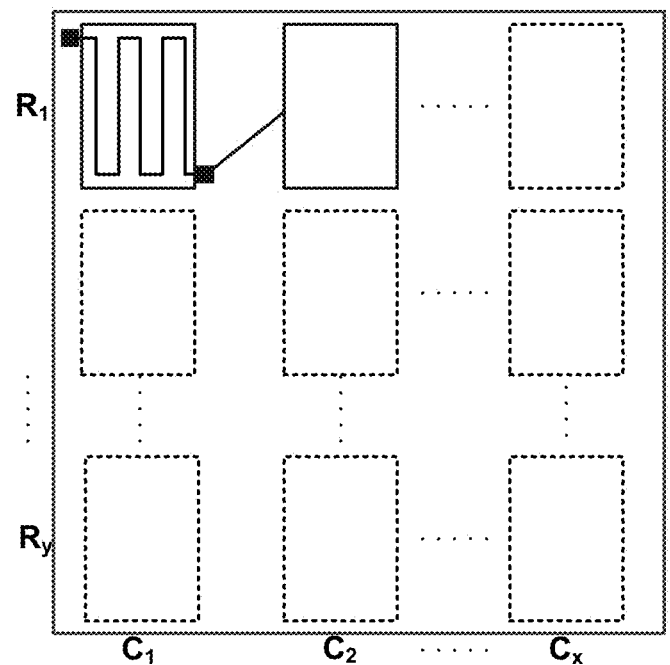
FIG. 5A-C illustrates three exemplary array configurations of a security array according to various embodiments of the invention.
Figure 5B:
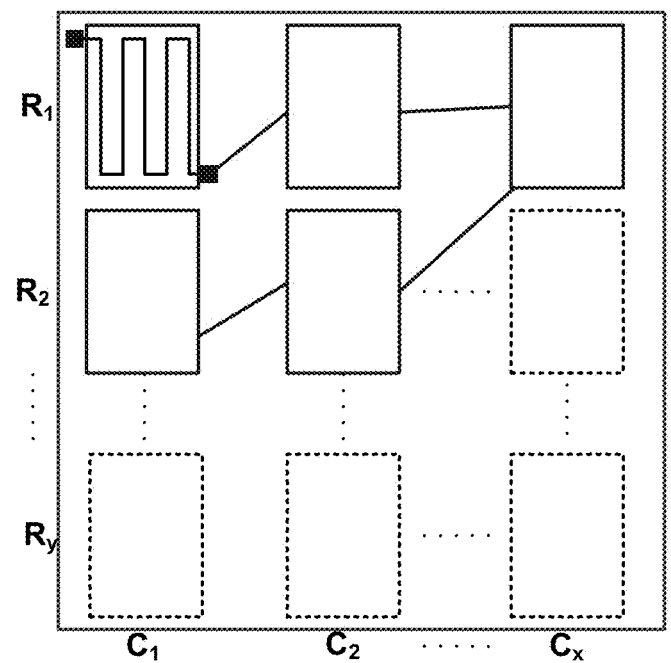
Figure 5C:
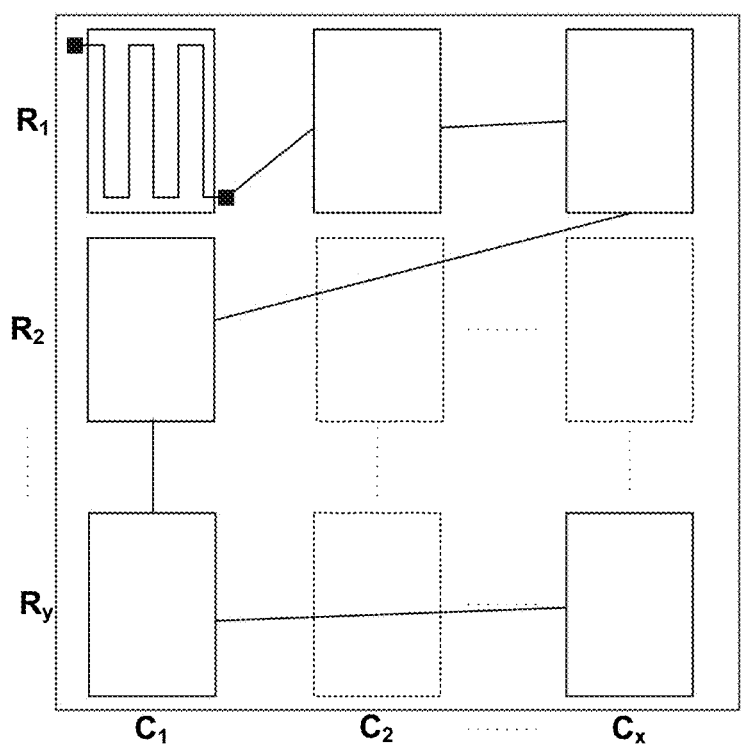

The security elements in the security mesh network 202 are selected according to the random numbers generated by the RNG 206 and form a security array according to an array configuration. FIG. 5A-C illustrates three exemplary array configurations 502, 504 and 506 of a security array according to various embodiments of the invention. In the array configuration 502, the security array comprises one security element. In the array configuration 504, the security array comprises all security elements in row $R_1$ and a few security elements in row $R_2$. These elements are coupled in series, and in particular, the security elements in row R1 is connected from left to right, while those in row R2 are connected from right to left. The elements in row R2 follows those in row R1, and the security array ends at the beginning of row R2. In the array configuration 506, the security array comprises security elements selected from all rows $R_1$-$R_y$, and at lest one selected security element is associated with each row. These elements are coupled in series, and an unselected security element $C_2$ may be located between two selected elements (e.g., $C_1$ and $C_x$). The element $C_2$ may be bypassed by routing via metal layers other than the metal layer used for this element $C_2$.

The above security arrays adopt a preferred array configuration of a serial resistor string. In this preferred configuration, each security array may be modeled as a series of resistors each of which representing a security element. The security array has two end nodes, and the resistance between these two end nodes is the sum of the resistances of the security elements included in this security array. In the array configurations 504 and 506, intermediate nodes are located between every two serial security elements.

In various embodiments of the present invention, the array configurations 502 to 506 may be associated with a binary state detection mode. The security controller 204 delivers a driving stimulus on one FORCE node, and the security monitor 206 monitors the output from another SENSE node. The FORCE node is selected from two end nodes and the intermediate nodes. The SENSE node is different from the FORCE node, and may not be limited to the end or intermediate nodes.

The binary state detection mode is one digital detection mode, and in particular, the driving stimulus is a digital signal associated with a time-varying binary pattern. When the SENSE node is selected from the end or intermediate nodes, the detected output is consistent with the time-varying binary pattern; otherwise, when the SENSE node is not in the path of the resistor string, the detected output may not comply with the pattern. An error is flagged by the flag signal when an unexpected output is detected.

FIG. 6A illustrates an exemplary block diagram 600 of a tampering detection system based on a digital detection mode according to various embodiments of the invention. In the tampering detection system 600, the security controller 204 and the security monitor 208 are connected to a FORCE and SENSE node of the security array 202, respectively. The security controller 204 drives the security array 202 with a digital stimulus, and the security monitor 208 verifies data validity at the SENSE node.

The security controller 204 comprises a multiplexer 610. The security elements in the security array are selected and coupled by this multiplexer 610 according to the random numbers 210 provided by the RNG 206. The multiplexer 610 includes the analog switches used by both the security controller 204 and the security monitor 208, such that the end and intermediate nodes in the security array are accessible for forming the security array and outputting the flag signal.

The security controller 204 also comprises a digital stimulus generator 612 that further comprises a state machine 602, a random bit generator 604 and a buffer 606. The state machine 602 controls a sequence of operations in the controller 204. The random bit generator 604 is coupled to the state machine 602, and generates a digital sequence of random bits (i.e., logic highs or lows) according to the state machine 602. The random bit generator 604 may also be included in the random number generator 206. The buffer 606 is coupled to the random bit generator 604 to properly drive the security array 202.

The security controller 204 comprises a digital detection circuit that is coupled to the SENSE node of the security array 202. The digital detection circuit detects an open or short condition of the security array. In certain embodiment, the digital detection circuit is a XOR logic that outputs a logic high when the output at the SENSE node is inconsistent with the random bit in the digital sequence.

FIG. 6B illustrates an exemplary block diagram 620 of a security controller driving a security array 202 in an analog mode according to various embodiments of the invention. Two end nodes of the security array 202 are respectively grounded and driven by a security controller 204 comprising a current source 622. The current source 622 is coupled to a voltage supply, and generates a current $I_{DR}$ to inject into the security array 202. In one embodiment, the current source 622 is based on a digital-to-analog converter (DAC) that is controlled by the RNG 206, and the magnitude of the resulting current $I_{DR}$ is specified by the random numbers generated by the RNG 206 as well.

The output may be monitored at a SENSE node that is selected from the end node FORCE-1 coupled to the current source 622 and the intermediate nodes in the security array 202. Given the resistance $R_{AN}$ between the SENSE node and the ground, the output voltage may be represented by $I_{DR} \times R_{AN}$. In one embodiment, the security array 202 includes one security element, and the output voltage is simply $I_{DR} \times R_{SE}$ at the same end node where the current $I_{DR}$ is injected.

FIG. 6C illustrates another exemplary block diagram 640 of a security controller driving a security array 202 in an analog mode according to various embodiments of the invention. The security array 202 comprises a number of security elements arranged in series. The security controller 204 includes two buffers 642 and 644 that may couple two end nodes FORCE-1 and FORCE-2 to a supply voltage $V_{DD}$ and the ground, respectively. In some embodiments, the security controller 204 may further comprise a voltage generator that generates a voltage $V_{DR}$ other than the supply voltage $V_{DD}$ to drive the security array. The voltage generator may be based on a DAC that outputs the voltage $V_{DR}$ according to a random number provided by the RNG 206.

The output may be monitored at a SENSE node that is selected from the intermediate nodes in the security array 202. In one embodiment, the security array 202 includes two serial security elements, and the output voltage is tested at their intermediate node in between. Therefore, without a tampering attempt, the output voltage at the SENSE node is around ½ VDD, and however, upon such an attempt, the output voltage shifts towards $V_{DD}$ or the ground.

FIG. 6D is an exemplary block diagram 660 of an analog detection circuit that may be included in the security monitor 208 in an analog mode according to various embodiments in the invention. The analog detection circuit 660 comprises a reference generator 662 and a comparator 664, and detects resistance variations in the security array. The reference generator 650 is coupled to receive a security mode signal 214 provided by the security controller 204, and generates a reference voltage $V_{REF}$ according to the array configuration. The security mode signal 214 is also used to select the SENSE node, and allows the voltage $V_{REF}$ to be generated in accordance with the location of the SENSE node. In the analog mode, the comparator 652 may be enabled by the enable signal 654 to compare the output at the SENSE node and the reference voltage $V_{REF}$.

Tampering attempts are normally associated with open circuit, entire shorting or partial shorting of at least one security element. The resistance of the security element changes. In accordance, the output voltage at the SENSE node drifts away from the reference voltage $V_{REF}$. Therefore, the comparator 652 is used to detect the drift of the output voltage and thus a resistance variation caused by the tampering efforts.

In various embodiments of the present invention, the comparator 652 detects a drift of the output voltage that is larger than a tolerance voltage $V_{TH}$. This voltage $V_{TH}$ is sufficient large to accommodate the drift caused by manufacturing process while being controlled to detect minor tampering efforts.

Figure 7A:
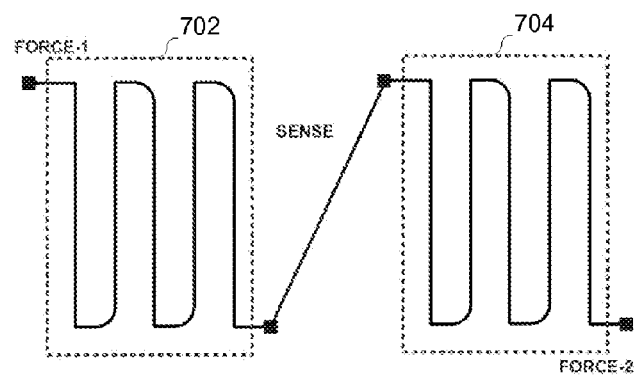
FIG. 7A illustrates an exemplary array configuration of a security array that comprises two security elements driven for an analog detection mode according to various embodiments of the invention.

FIG. 7A illustrates an exemplary array configuration 700 of a security array that comprises two security elements 702 and 704 driven for an analog detection mode according to various embodiments of the invention. These two security elements are selected according to two random numbers provided by the RNG 206, and they may be physically adjacent to each other or separated apart. The security array 700 comprises two end nodes, FORCE-1 and FORCE-2, and one intermediate node SENSE.

The array configuration 700 is associated with an intermediate state detection mode which is one analog detection mode. The security controller 204 drives two end nodes (i.e., FORCE-1 and FORCE-2) with a high and low voltage (e.g., $V_{DD}$ and ground), respectively, and the security monitor 206 monitors the output from the SENSE node. An un-tampered security array 700 is associated an output substantially averaging the high and low voltage.

In certain embodiments, the element 702 is broken, partially or entirely shorted upon tampering. As a result, the output monitored at the SENSE node varies from a level averaging the high and low voltage in the un-tampered security array to the low voltage (e.g., ground), an elevated voltage or the high voltage (e.g., $V_{DD}$), respectively. If the output is out of the average level window, then a tampering is detected.

Figure 7B:
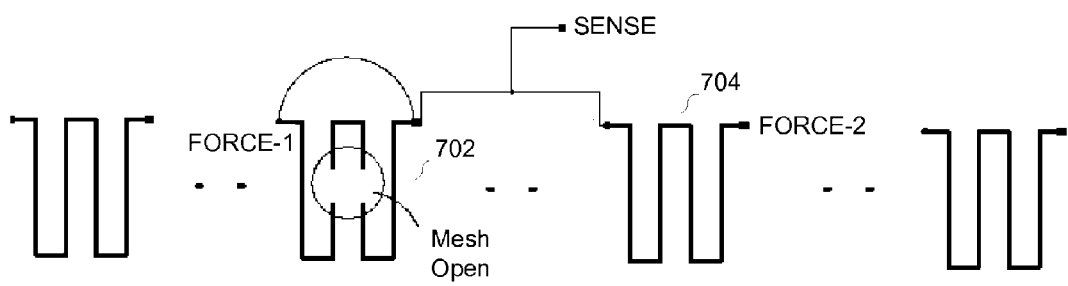
FIG. 7B illustrates an exemplary array configuration of a security array in which the security element is tampered according to various embodiments of the invention.

A certain array configuration of the security mesh network 202 may be associated with a preferred detection mode between the digital and analog detection modes in the security controller 208. FIG. 7B illustrates an exemplary array configuration 720 of a security array in which the security element 702 is tampered according to various embodiments of the invention. The hacker probes through the element 702, and creates an open circuit. Although both digital and analog modes may be employed, the analog mode is preferred. In a binary state detection mode, a driving stimulus is applied to nodes FORCE-1 or FORCE-2. If the hacker may use a wire to short the nodes FORCE-1 and SENSE, bypassing the open circuit area, the security monitor 208 may fail to detect this unauthorized access. However, in an intermediate state detection mode, a high and low voltage is applied on the nodes FORCE-1 and FORCE-2 respectively. Therefore, when entire or partial wire in the element 702 is bypassed by the hacker, the security monitor 208 detects that the output at node SENSE shifts from averaging the high and low voltages towards the high voltage.

The analog and digital detection modes have a respective strength of being accurate and power efficient. In the analog mode, the drift of the output voltage is normally directly associated with the damage or the impact that certain tampering attempt causes. The analog mode allows a better accuracy and may even detect the tampering attempt a digital mode is not applicable to (FIG. 7B). However, the analog mode is associated with a static power consumption, not only due to a need to drive the security array 202 but also due to a tendency of using analog circuit units, e.g., the current source 622. Instead, the digital mode is normally associated with a dynamic power consumption which may be reduced by using a slower clock. The analog and digital detection modes may be combined in one tampering detection system to keep both strengths.

A mixed detection mode is based on a combination of the analog detection mode and a digital detection mode. In one embodiment, an analog detection mode is employed in one clock cycle, and followed by a digital detection mode employed for the subsequent clock cycles. As a result, both strengths of being accurate and power efficient are combined in this mixed detection mode.

Figure 8:
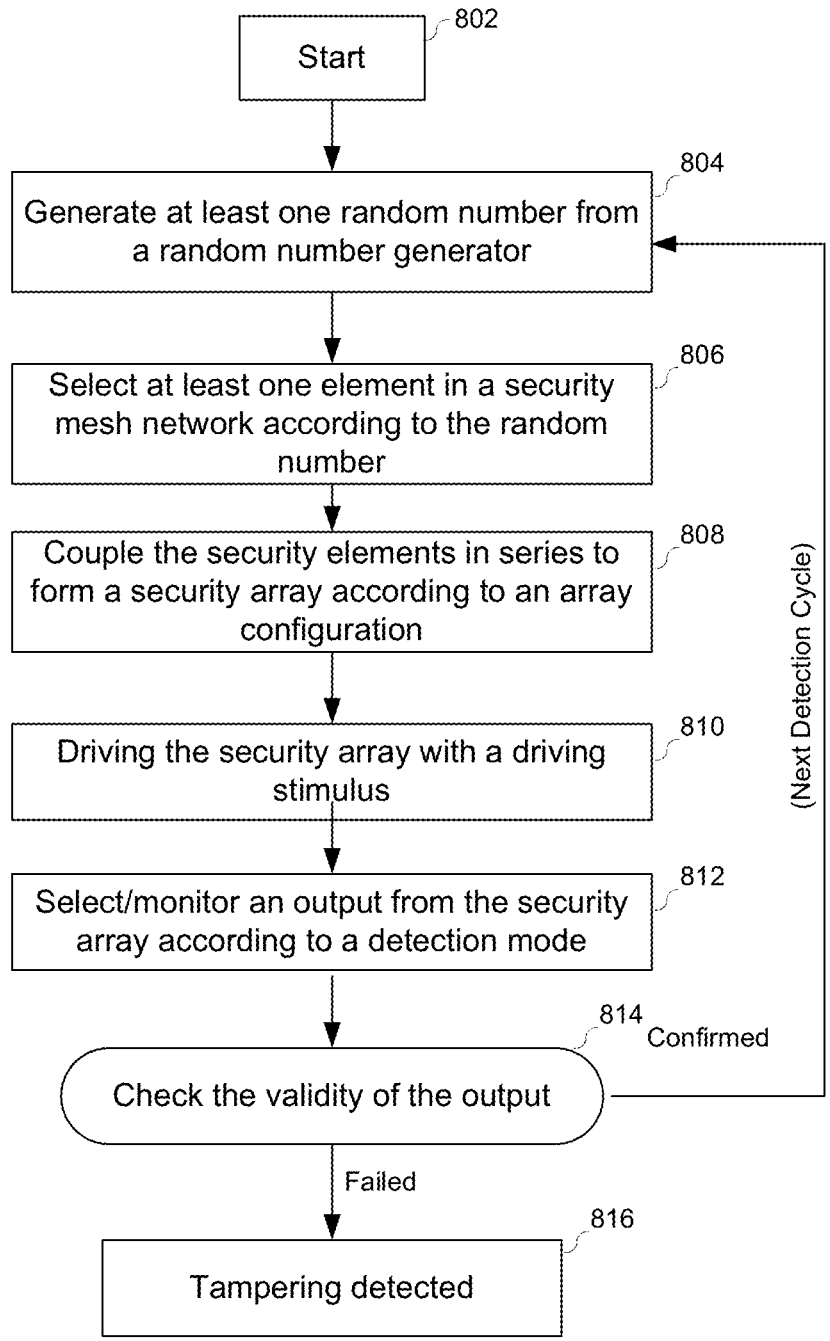
FIG. 8 illustrates an exemplary flow chart of a tampering detection method according to various embodiments in the invention.

FIG. 8 illustrates an exemplary flow chart of a tampering detection method according to various embodiments in the invention. At step 802, the tampering detection process starts up. As a first step in a tampering detection cycle, a random number generator generates at least one random number at step 804. At step 806, at least one security element is selected in a security mesh network, and at step 808, the selected security elements are coupled in series to form a security array according to an array configuration. The security mesh network is randomized to the security array in steps 806 and 808.

At step 810, the security array is driven with a driving stimulus that may be a digital sequence of logic highs or lows, an analog voltage or current. At step 812, an output is selected from the security array and monitored according to a detection mode. At step 814, validity of the output at the selected node is checked. When the validity is confirmed, a next detection cycle comprising steps 804-814 is repeated, and however, when the validity check fails, the detection cycles are terminated to flag detection of a tampering attempt.

The detection mode may be selected from a group consisting of an analog mode, a digital mode or a mixed mode. The array configuration, the driving stimulus and the nodes selected for driving and sensing are associated with the detection mode. Moreover, these variables may be determined by the random numbers generated randomly by the RNG 206 during each detection cycle.

In various embodiments of the present invention, the programmability and randomness enhances sensitivity of a tampering detection system, and thus security level for the sensitive area protected by the security mesh network. The tampering detection system incorporates variables including the array configuration, driving stimulus, selection of sensing nodes, and detection modes. These variables introduces programmability and randomness to a security mesh network including physical location, driving signals, detection location and detection method. Even if some, but not all, of these variables are employed, the present invention allows a highly unpredictable mesh network that a hacker has little or no chance to break into.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A tampering detection system in a secured system, comprising:
   a security mesh network that comprises a plurality of security elements, each security element being made from a conductive metal wire located above a sensitive area of an integrated circuit;
   a random number generator that generates a plurality of random numbers;
   a security controller, coupled between the random number generator and the security mesh, the security controller randomizing the security mesh network by selecting a subset of the plurality of security elements according to at least one random number, forming a security array according to an array configuration, and generating a driving stimulus to drive the security array at at least one FORCE node; and
   a security monitor, coupled to the security mesh network and the security controller, the security monitor selecting at least one SENSE node, monitoring an output at the SENSE node according to a detection mode, and generating a flag signal indicating whether a tampering attempt is detected, the detection mode being associated with the driving stimulus.

2. The tampering detection system in claim 1, wherein as the plurality of random numbers changes between two consecutive detection cycles, at least one of the array configuration, the at least one SENSE node and at least one FORCE node of the security array is determined accordingly by the plurality of random numbers.

3. The tampering detection system in claim 1, wherein the detection mode is selected from an analog detection mode, a digital detection mode and a mixed detection mode according to a random number selected from the plurality of random numbers.

4. The tampering detection system in claim 1, wherein the security controller and monitor comprises analog switches to access end nodes of the security elements, such that these end nodes may be coupled to form the security array and selected as the SENSE and FORCE nodes.

5. The tampering detection system in claim 1, wherein the detection mode is a digital detection mode, such that the security controller further comprises a digital stimulus generator that generates a digital driving stimulus to drive the security array at the FORCE node, and the security monitor further comprises a digital detection circuit that detects an open or short condition of the security array.

6. The tampering detection system in claim 1, wherein the detection mode is an analog detection mode, such that the security controller generates an analog driving stimulus to drive the security array, and the security monitor further comprises an analog detection circuit that detects a resistance variation of the security array.

7. The tampering detection system in claim 6, wherein the analog driving stimulus is selected from a current and a voltage, and the security controller further comprises an analog stimulus generator selected from a current source and a voltage generator.

8. A method of detecting a tampering attempt in an integrated circuit in a secured system, comprising the steps of:
   (1) generating a plurality of random numbers;
   (2) randomizing a security mesh network to form a security array, the security mesh network comprising a plurality of security elements that are arranged above a sensitive area of the integrated circuit;
   (3) generating a driving stimulus to drive the security array;
   (4) selecting a SENSE node from end nodes and intermediate nodes in the security array;
   (5) monitoring the output at SENSE node according to a detection mode that is associated with the driving stimulus; and
   (6) outputting a flag signal indicating whether a tampering attempt is detected.

9. The method of detecting a tampering attempt in claim 8, wherein randomizing a security mesh network to form a security array, further comprises the steps of:
   (a) selecting a subset of the plurality of security elements according to at least one random number, the plurality of security elements being included in a secure mesh network that covers sensitive area of the integrated circuit;
   (b) coupling the selected security elements in series to form a security array according to an array configuration.

10. The method of detecting a tampering attempt in claim 9, wherein the plurality of random numbers changes between two consecutive detection cycles, the array configuration and the at least one SENSE node of the security array are determined accordingly by the plurality of random numbers.

11. The method of detecting a tampering attempt in claim 8, wherein the SENSE node is selected according to a first random number selected from the plurality of random numbers.

12. The method of detecting a tampering attempt in claim 8, wherein the detection mode is selected from an analog detection mode, a digital detection mode and a mixed detection mode according to a second random number selected from the plurality of random numbers.

13. The method of detecting a tampering attempt in claim 8, wherein the detection mode is a digital detection mode, such that the driving stimulus comprises a digital data sequence, and the output at the SENSE node is associated with an open or short condition of the security array.

14. The method of detecting a tampering attempt in claim 8, wherein the detection mode is an analog detection mode, such that an analog driving stimulus is generated to drive the security array, and the output at the SENSE node is associated with a resistance variation of the security array.

15. The method of detecting a tampering attempt in claim 14, wherein the analog driving stimulus is selected from a current and a voltage, and the security controller further comprises an analog stimulus generator selected from a current source and a voltage generator.

16. The method of detecting a tampering attempt in claim 8, wherein the detection mode is a mixed detection mode, such that the driving stimulus is selected from a group consisting of a digital data sequence, a voltage and a current, and the outputs is monitored to indicates a condition selected from an open circuit, a short circuit and a resistance variation of the security array.

17. The method of detecting a tampering attempt in claim 8, wherein the driving stimulus is generated according to another subset of random numbers in the plurality of random numbers.

18. A tampering detection system in a secured system, comprising:
 a security mesh network that comprises a plurality of security elements, each security element being made from a conductive metal wire located above a sensitive area of an integrated circuit;
 a random number generator that generates a plurality of random numbers;
 a security controller, coupled between the random number generator and the security mesh, the security controller randomizing the security mesh network by selecting a subset of the plurality of security elements according to at least one random number, forming a security array according to an array configuration, and generating a driving stimulus to drive the security array at at least one FORCE node; and
 a security monitor, coupled to the security mesh network and the security controller, the security monitor selecting at least one SENSE node, monitoring an output at the SENSE node according to a mixed detection mode, and generating a flag signal indicating whether a tampering attempt is detected, the detection mode being associated with the driving stimulus.

19. The tampering detection system in claim 18, wherein the security controller comprises at least one digital stimulus generator and at least one analog stimulus generator, and the security monitor comprises at least one digital detection circuit that detects an open or short condition of the security array and at least one analog detection circuit that detects a resistance variation of the security array.

20. The tampering detection system in claim 18, wherein both the digital stimulus generator and the analog stimulus generator are coupled to the random number generator, and the driving stimulus is generated according to another subset of random numbers generated by the random number generator.

* * * * *